United States Patent Office 3,450,017
Patented June 17, 1969

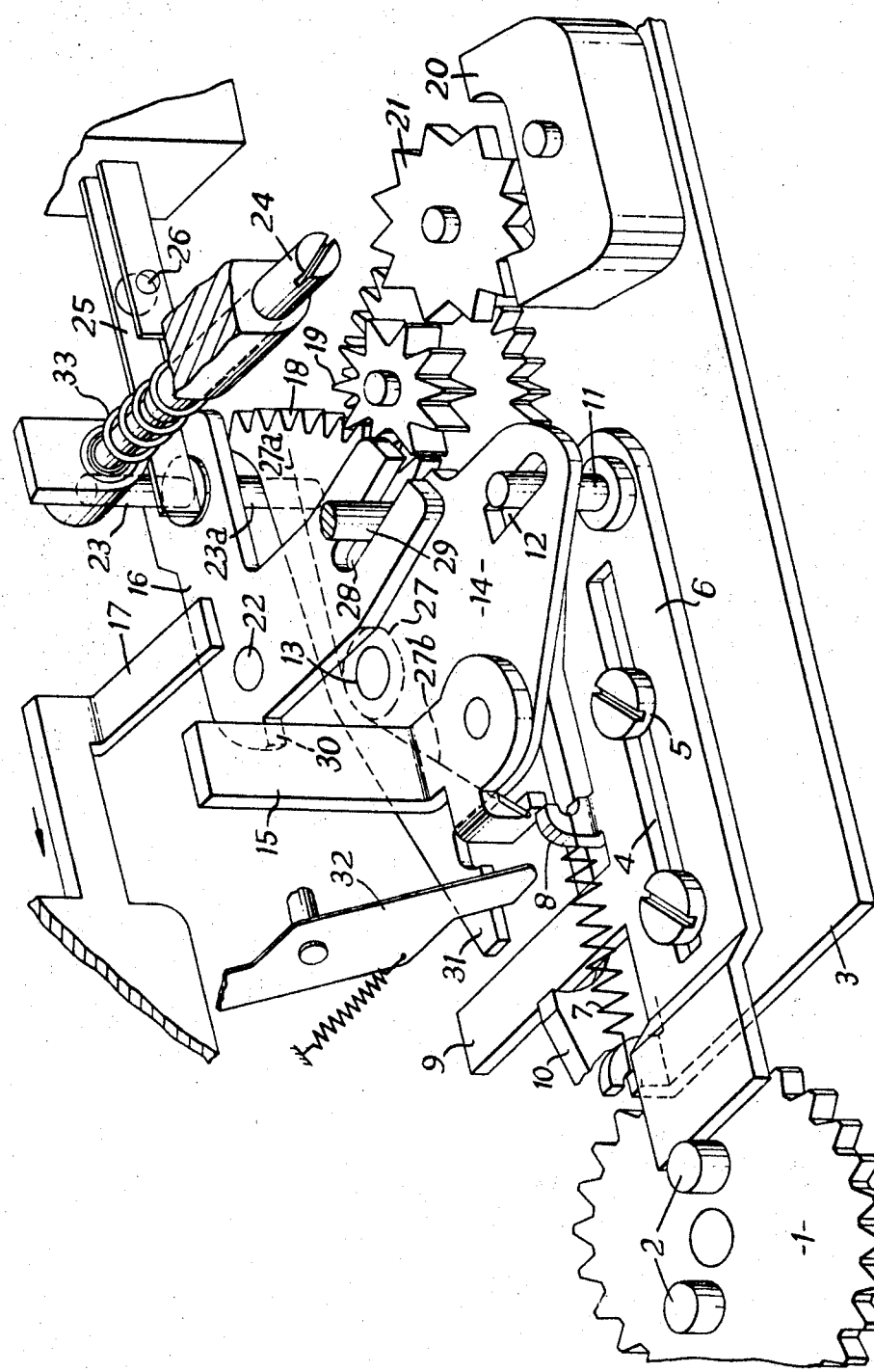

3,450,017
CAMERAS
Rolf Noack, Dresden, and Karl Krömer, Radebeul, Germany, assignors to VEB Pentacon Dresden Kamera- und Kinowerke, Dresden, Germany
Filed Apr. 15, 1966, Ser. No. 542,852
Int. Cl. G03b 19/12
U.S. Cl. 95—42   3 Claims

ABSTRACT OF THE DISCLOSURE

A mirror return mechanism for a reflex camera consisting of first and second segment levers, a spring biased slider member, and an escapement device in engagement with the first segment lever. The first segment lever is coupled to the slider member by a pin and slot connection which causes the lever to pivot a counter-clockwise direction when the slider member is moved to its biased position. The second segment lever is interconnected with the mirror mounting and normally maintains the mirror in the path of the picture-taking axis. Upon release of the slider member from its biased position, the first segment lever pivots in a clockwise direction and subsequently engages the second lever causing it to pivot in a clockwise direction. When the second lever pivots in the clockwise direction it moves the mirror out of the path of the picture-taking axis and sets the objective diaphragm to a pre-selected position.

Background of invention

The present invention relates to a mirror-return gearing for curtain-type shutter cameras having two segment levers each influenced by a spring, which levers are coupled during the pivoting of the mirror into the picture-taking position and the setting of the objective diaphragm to a pre-selected position, and are uncoupled by a shutter member during the return of the mirror into the viewing position and of the diaphragm to full aperture.

Such a mirror-returning gearing, in view of the lower expenditure on components and of the compact construction style thus possible, is especially suitable for miniature cameras, especially those of the so-called half-frame type, (18–24 mm.).

In cameras of the half-frame type a smaller mirror is compared with mirrors in full frame cameras used, which accordingly also has a small mass. This small mass has the result that the mirror movement and the control of the diaphragm connected in function therewith take place extraordinarily rapidly.

Since the release of the shutter takes place directly after the closing of the objective diaphragm to the preset value, the diaphragm blades have not yet settled at the moment when the exposure is effected, due to the mentioned high running-off speed of the gearing, so that the actual diaphragm aperture can deviate from the set intended value and thus incorrect exposures may occur.

Now it is the problem of the present invention to design a mirror-return gearing of the initially mentioned kind so that in execution of the exposure the maintenance of the pre-selected diaphragm value is ensured.

Summary of the invention

According to the invention this problem is solved due to the fact that the segment lever connected with the cocking gearing of the camera is coupled through a pin-slot connection with a spring-loaded slider which releases the shutter, and is formed as toothed segment which is constantly in engagement with the gear escapement.

The arrangement according to the invention effects a retardation of the running off of the gearing for the transference of the mirror into the picture-taking position and thus also of the objective diaphragm into the pre-selected closure position, so that a deviation of the diaphragm value from the pre-selected intended value cannot take place.

In the return of the mirror into the viewfinding position, after the picture has been taken and after the diaphragm has been fully opened, the retarding arrangement is inoperative on the other hand.

An example of embodiment of the invention will be explained in greater detail hereinafter with reference to the drawing.

A cocking wheel 1, coupled in a manner not illustrated further with the film-winding gearing and operable by an operating handle, carries two eccentric pins 2 offset through 180° (180° operating angle), which control a slider 6 guided on a plate 3 by means of a slot 4 and screws 5. A central force-storage means is formed by a spring 7 which is attached on the one hand to the plate and on the other to a nose 8 of the slider 6. The slider 6 has an arm 9 which co-operates in a manner to be described hereinafter with a nose 10 of a release lever (not shown further). Furthermore the slider 6 carries a pin 11 which engages in a slot 12 of a segment lever 14 mounted at 13 on the frame. On this lever a pawl 15 is pivotably mounted, which co-operates in a manner to be described hereinafter with a segment lever 16 and a slider 17 controlled by the shutter mechanism. Moreover on the segment lever 14 there is machined a toothed segment 18 which meshes with a gear wheel 19 which is in communication through intermediate wheels with an escape wheel 21 influenced by an escapement lever 20.

The segment lever 16, which is mounted on the frame 22, carries a bolt 23 which acts upon the diaphragm plunger 24 and the movable contact spring 25 of a flash-contact 26. The part 23a of the bolt 23, conducted through the segment lever 16, forms the abutment for an arm 27a of a torsion spring 27 mounted about the pivot point 13 of the segment lever 14, the other arm 27b of which spring presses the pawl 15 against the segment lever 14. The force of the spring 27 is less than the force of the spring 7. The segment lever 16 also has a slot 28 in which there engages a pin 29 secured on the mirror-mounting (not shown) and pivoting the mirror. Furthermore the segment lever 16 possesses a nose 30 which co-operates with the pawl 15 in a manner to be described hereinafter.

The segment lever 14 has a nose 31 which co-operates with a lever 32 which is pivotable into the field of view of the viewfinder.

The manner of operation of the arrangement according to the invention is as follows:

On rotation of the cocking wheel 1 by operation of the operating handle (not shown), the slide 6 is shifted by one of the eccentric pins 2 and at the same time the spring 7 is tensioned. In this cocking operation the film is wound on in a manner not illustrated further, and by means of the arm 9 arranged on the slider 6 an escapement mechanism is cocked in a manner also not illustrated further, which retards the running off of the second curtain of a curtain-type shutter in relation to the first curtain. In the cocking operation furthermore the segment lever 14 and the pawl 15 mounted on it are pivoted in the counter-clockwise direction (as seen in the drawing) through the pin 11 and the slot 12, while the pawl 15, drawn against the segment lever 14 by the spring arm 27b, places itself before the nose 30 of the segment lever 16, overcoming the force of the said spring. Furthermore the lever 32, indicating the uncocked condition of the camera, is pivoted in the cocking operation out of the field of view of the viewfinder by means of the nose 31 arranged on the segment lever 14. At the end of the cocking movement the arm 9 of the slider 6 places itself behind the nose 10 arranged on the release lever. The camera is now in the cocked condition and ready for picture taking. This condition of the camera is illustrated in the drawing.

On operation of the release lever its nose 10 liberates the running off of the slider 6, which is drawn by the spring 7 into its rest position. This running off is retarded in time, since the toothed segment lever 14 engages with its toothed segment 18 in the gear escapement train 19–21. In running-off, the segment lever 14 rotates in the clockwise direction and through the pawl 15 and the nose 30 entrains the segment lever 16. In this pivoting movement the diaphragm plunger 24 is shifted in the direction of the objective against the force of compression spring 33 by means of the bolt 23, and the diaphragm is then set to the pre-selected value. At the end of the movement of the plunger 24 the flash-contact 26 is closed with the aid of the bolt 23 which strikes against the movable contact spring 25. During the pivoting movement of the segment levers 14 and 16 the mirror is brought into the picture-taking position, through the pin 29 guided in the slot 28, and at the same time through the spring arm 27a which bears on the lower part 23a of the bolt 23, the spring 27 is tensioned. Similarly in the pivoting of the segment lever 14 the lever 32 is pivoted into the field of view of the viewfinder again, through the nose 31 of the segment lever 14.

At the end of the movement of the slider 6 into its rest position the first curtain and the running off of the escapement releasing the second curtain is liberated in a manner not further illustrated by the arm 9 arranged on the slider 6. The slider 17 lying in the running-off path of the second curtain is shifted in the direction of the arrow, after exposure is completed, and in this movement pivots the pawl 15, so that the segment lever 16 is liberated and pivoted in the counter-clockwise direction by the force of the spring 27, the mirror being brought into the observation position again through the pin 29 and the objective diaphragm being brought to full aperture by relaxation of the compression spring 23 and the return of the diaphragm plunger 24 taking place therewith.

We claim:
1. In a photographic mirror reflex camera having a curtain-type shutter driven by shutter mechanism and controlled by an escapement mechanism, a mirror pivotable between a viewing position where it is positioned in the optical path through the camera to a picture-taking position clear of said path to enable exposure to take place, mirror pivoting mechanism, and an aperture diaphragm, the provision of:
(a) a first spring-loaded lever having a toothed segment thereon in mesh with a further escapement mechanism,
(b) a second spring-loaded lever for controlling said aperture diaphragm and said mirror pivoting mechanism,
(c) a spring loaded slider movable from a rest position to a cocked position operatively connected both with the shutter mechanism and with said first lever,
(d) means for coupling said first and second levers together on release of said slider from its cocked position which effects actuation of said shutter mechanism and through said levers effects pivoting of said mirror out of the optical path through the camera together with the closing down of the aperture to a pre-selected value, and
(e) a release member on said shutter mechanism for effecting uncoupling of the levers to permit the mirror to return to the viewing position and the diaphragm aperture of open fully.

2. A camera according to claim 1, wherein said second lever has a nose, and wherein the coupling means comprises a spring-loaded pawl pivotally mounted on said first lever engageable with said nose formed on said second lever.

3. A camera as claimed in claim 1, wherein the first lever is provided with a nose which moves an indicating member out of the optical path as the slider is moved to its cocked position.

References Cited
UNITED STATES PATENTS 3,257,923    6/1966    Maitani _____ 95—42
3,319,551    5/1967    Ettischer et al. _____ 95—42

NORTON ANSHER, *Primary Examiner.*

F. L. BRAUN, *Assistant Examiner.*

U.S. Cl. X.R.

95—53, 64